May 26, 1959  G. D. WILLIAMSON, JR  2,887,910
PORTABLE ADJUSTABLE DRILL PRESS
Filed Oct. 2, 1957  3 Sheets-Sheet 1
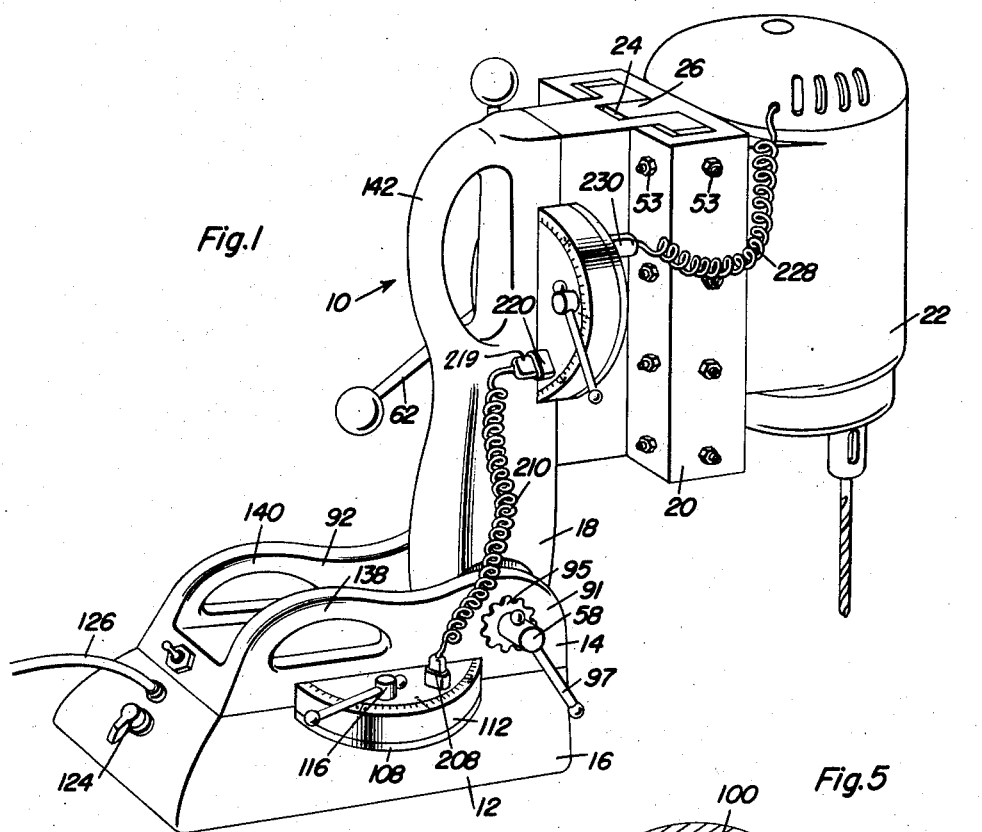
Fig.1
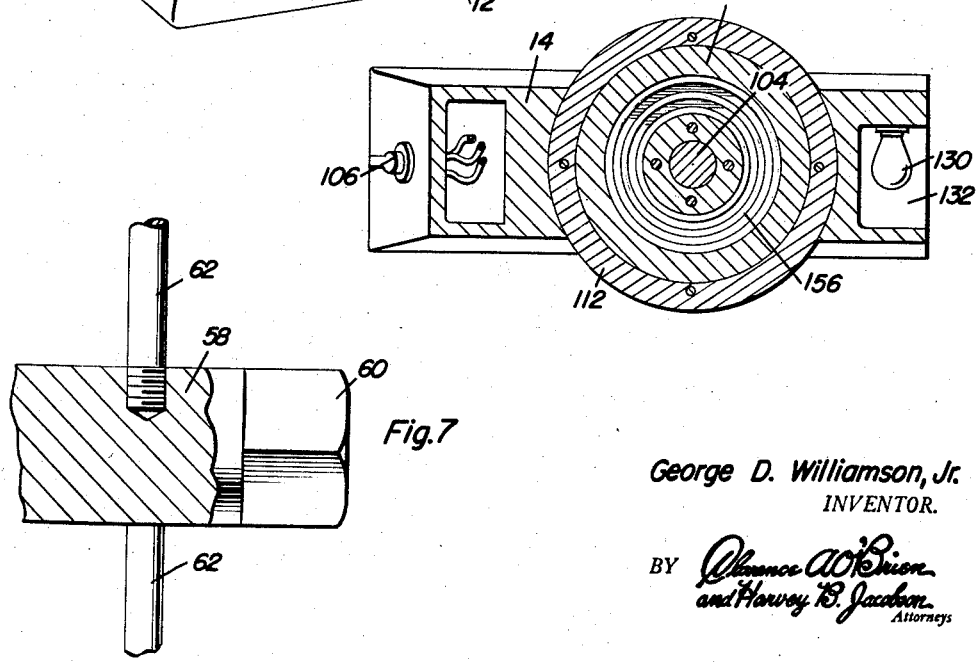
Fig.5
Fig.7
George D. Williamson, Jr.
INVENTOR.
BY *Clarence A. O'Brien*
*and Harvey B. Jacobson*
Attorneys May 26, 1959  G. D. WILLIAMSON, JR  2,887,910
PORTABLE ADJUSTABLE DRILL PRESS
Filed Oct. 2, 1957  3 Sheets-Sheet 2
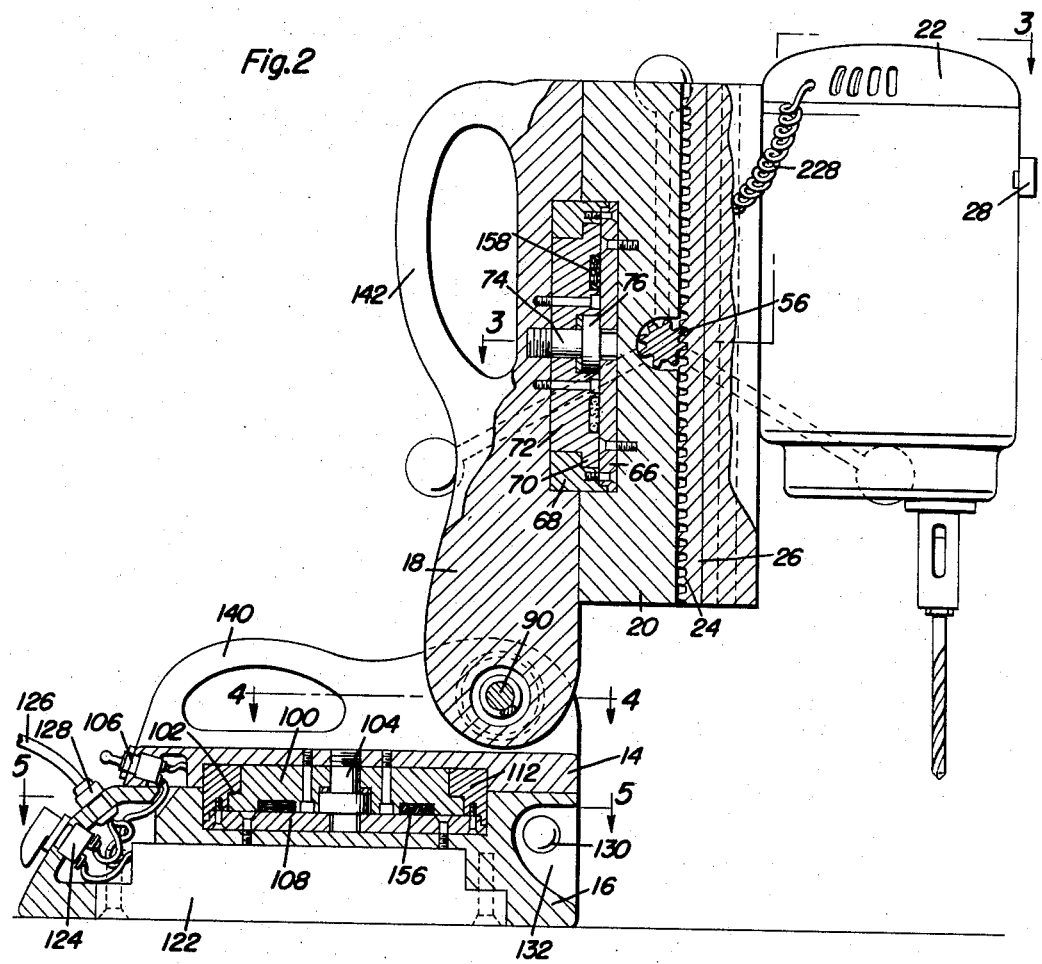
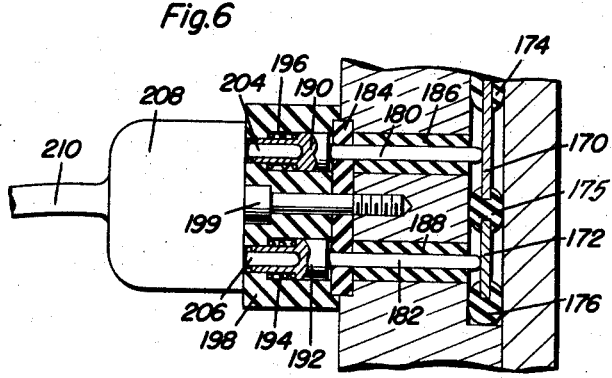
George D. Williamson, Jr.
INVENTOR.

May 26, 1959

G. D. WILLIAMSON, JR 2,887,910

PORTABLE ADJUSTABLE DRILL PRESS

Filed Oct. 2, 1957

George D. Williamson, Jr.
INVENTOR.

BY *Clarence A. O'Brien*
*and Harvey B. Jacobson*
Attorneys

United States Patent Office 2,887,910
Patented May 26, 1959

2,887,910
PORTABLE ADJUSTABLE DRILL PRESS
George D. Williamson, Jr., Columbiana, Ohio
Application October 2, 1957, Serial No. 687,801
3 Claims. (Cl. 77—20)

This invention relates to power tools and more particularly to a portable and adjustable drill press.

An object of the present invention is to provide a practical, portable adjustable drill press constructed of a chuck supporting motor unit which is attached to a novel stand in such a manner that the drill press is easily handled and does an excellent job.

In the practice of my invention I have a stand that is fitted with a magnetic base to attach it to a work table or other magnetizable surface, the stand having also an upright and a clamp for a drill actuating motor. The drill is capable of adjustment about a horizontal axis by the rotation of the drill, and the upright of the stand is capable of adjustment about an intersecting horizontal axis. Further adjustment is achieved at the base where provision is made for adjustment about a vertical axis.

One of the important features of the invention is in the electrical organization. A cord is adapted to connect to a source of electrical energy, and there is a switch in the line by which to control the energization of the motor of the drill press. Another switch is arranged to control the energization of the magnet. A novel receptacle and slip ring assembly is used to transfer electrical energy from the stand to the electric motor of the drill press. In the past, electric drill presses of the type which use an electric motor of a hand drill as the power source for the drill bit or other tool, made no provision, aside from a clamp, to care for the electric wiring. Occasionally the wire becomes bothersome. My invention has for one of its objects, the provision of a unique manner of interconnecting the moving parts of the drill press stand and the motor on the drill press stand.

A further object of the invention is to provide a practical, portable drill press which has considerable improvement in the structure by which the drill press is constructed. Such items as a handle made into the upright part of the base for ease of moving it from one place to another, and the durable rails together with stops and scales for depth measurement, are embodied in my invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a drill press constructed in accordance with the invention.

Figure 2 is an elevational view of the drill press in Figure 1, parts being broken away in section to illustrate internal detail.

Figure 5 is an enlarged sectional view taken on the line 5—5 of Figure 2.

Figure 6 is an enlarged sectional view of a plug and socket and slip ring assembly which constitutes a part of the invention.

Figure 7 is an enlarged fragmentary sectional view of the handle.

Figure 3:
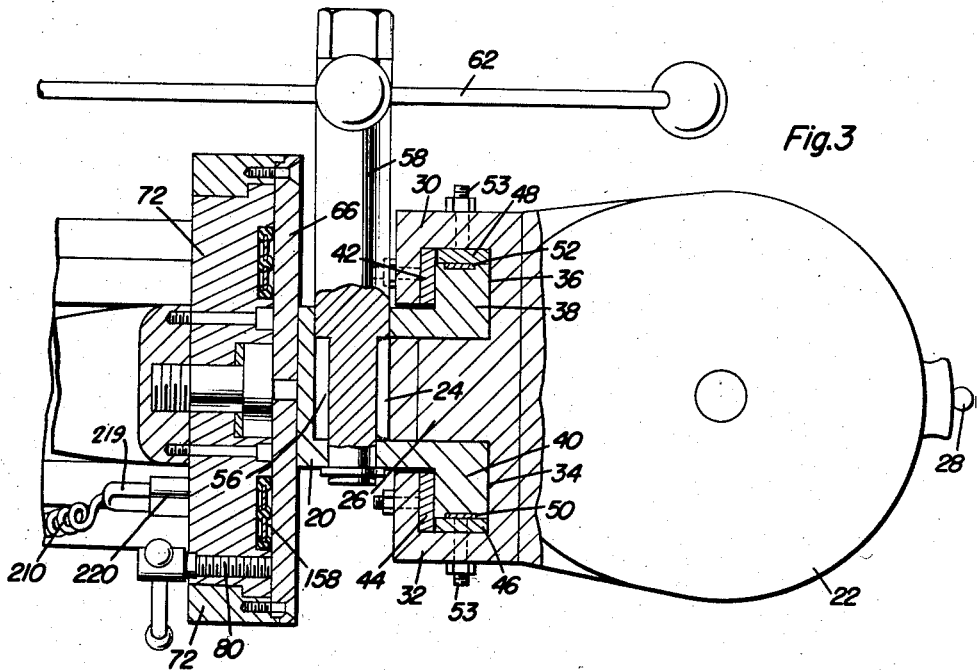
Figure 3 is a sectional view taken on the line 3—3 of Figure 2.

In the accompanying drawings there is a portable and adjustable drill press 10 which is constructed in accordance with the principles of the invention. It is made of a base 12 with an upper section 14 and a lower section 16, together with an upright 18 adjustably attached to the upper section 14. Clamp 20 which is adjustable about an axis of rotation, is carried by the upright 18 of the stand, and it supports electric motor 22 whose housing is constructed with a rack gear 24 along the outer edge of elongated rail 26.

Motor 22 is a high quality electric motor with a forward, reverse and off switch 28 mounted on the motor housing. The motor housing may be cast with rail 26 or the rail may be otherwise attached to it. Tracks 30 and 32 are on opposite sides of the rail 26. They are L-shaped and enclose longitudinal passageways 34 and 36 in which guides 38 and 40 are slidable. The guides constitute a part of the support 20, and they have considerable clearance between their surfaces and the surfaces of the tracks 30 and 32. Wear plates 42 and 44 are disposed along one surface of the guideways, and wear plates 46 and 48 are along other surfaces thereof. Scales 50 and 52 are mounted stationarily in the passageways and are inset in guides 38 and 40 so that the machinist or other user of the drill press can tell at a glance the necessary information as to the depth of drill by reading above the slide and below. Stop and adjustment screws 53 are connected with the wear plates 46, 44, 42 and 48, and they function to assure that the drill motor slide moves smoothly even after a considerable amount of service.

Pinion 56 is on the end of shaft 58 carried by clamp 20, and is enmeshed with the teeth of rack 24. The shaft has a wrench accommodating end 60 on it together with removable handles 62 which can be substituted for smaller or larger ones. The purpose of the handles is to facilitate the raising and lowering of the drill once the drill press has been set up for use. This is accomplished by movement of the rack gear 24 caused by pinion 56.

The support for the drill motor is rotatable to selected adjusted positions about an axis which is shown as horizontal in Figure 2, but which could be altered depending on the angularity of the upright 18. The motor support has a mounting plate 66 connected to it, as by screws, and recessed therein. Annular ring 68 is connected to the plate 66 and it has an annular shoulder 70 seated therein. The shoulder is stationary with the upright 18 and is formed on the periphery of disk 72 that is bolted or otherwise attached to the upright 18. Center bolt 74 is threaded in the upright and has a head 76 located in a circular recess formed in disk 72. A washer is behind the head 76. A locking bolt 80 is threaded in the disk 72 and bears against the surface of plate 66 to retain a selected adjustment of the motor support 20 after it has been obtained.

Figure 4:
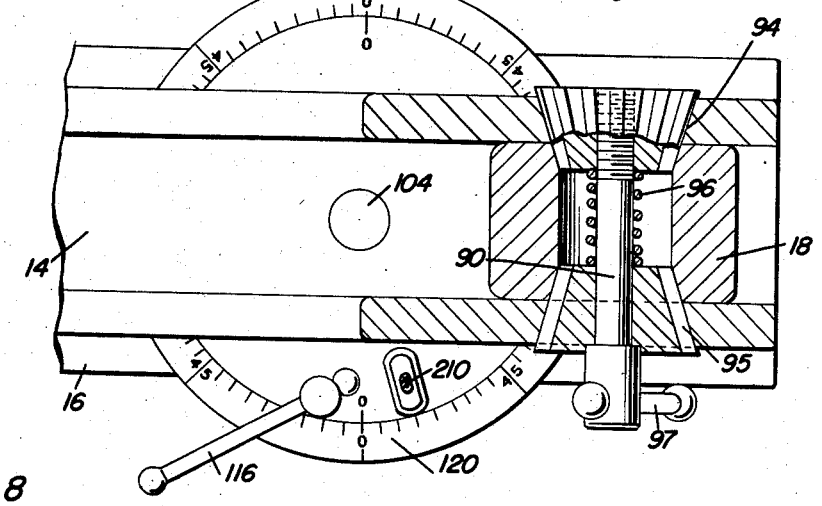
Figure 4 is an enlarged sectional view taken on the line 4—4 of Figure 2.

Pin 90 is passed through sides 91 and 92 of the upper section of base 16 and through a bore in the lower end of the upright 18. The upright 18 lower end is disposed between the sides 91 and 92 and is held in place by a conical locking device (Figure 4). This conical locking device is constructed of a pair of conical members 94 and 95 that are seated in the conical side walls of the bores and holes through which bolt 90 is passed. The surfaces of conical members 94 and 95 may be grooved, serrated, formed with teeth or otherwise broken. This is to assure that a firm frictional grip will exist between the parts that they couple together. Spring 96 is concentrically arranged on the bolt 99 and acts on the two conical members 94 and 95. Bolt 90 is threaded into one of the conical members and passes freely through the other. When the handle 97 on bolt 90 is turned in one direction, the members 94 and 95 will be drawn together very tightly to bind the upright to the upper section 14 of the base 12. However, when the bolt 90 is turned in the other direction, the spring 96 spreads the conical members and allows the upright to adjust rather freely.

The upper section 14 of the base has a disk 100 connected to it with an annular shoulder 102 about its edge. The center bolt 104 is carried by the upper section 14, as is drill motor switch 106. Plate 108 is attached to the lower section of the base and it supports rings 112 which are attached to it, and it has an annular groove in engagement with shoulder 102. Locking bolt 116 is secured to the upper plate and engaged with plate 108 to hold and keep a selected setting of adjustment of the upper section with respect to the lower section of the base. Graduations 120 (Figure 4) on the ring 112 and disk 100 provide information concerning the angularity of the upper and lower base sections with respect to each other.

An electromagnet 122 is carried by the lower section 16 of the base, and it has a switch 124 connected with it by which to control the energization of the magnet. Line cord 126 is passed through a grommet 128 in the lower section of the base and has wiring connections (Figure 8) with the electromagnet, the motor 22 and a lamp 130 which is disposed in recess 132 formed at the end of the lower section of the base. This lamp assures that there will be illumination on the work. The lamp becomes lighted when magnet is turned on and acts as magnet warning light.

Figure 8:
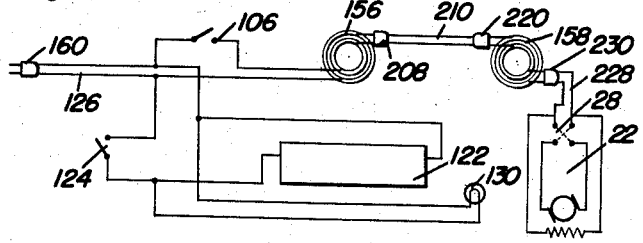
Figure 8 is a wiring diagram which is typical for my portable drill press.

Handles 138 and 140 on the upper section of the base are used in coordination with handle 142 on the upright 18 to manipulate and carry the portable drill press. As seen in Figure 8, there are three plugs 208, 220 and 230 which are operatively connected with slip ring assemblies 156 and 158. Plug 160 connected with line 126 schematically represents a connection with an external source of electrical energy. Assembly 156 is made of a pair of rings 170 and 172 (Figure 6) located in an annular recess in disk 100. They are carried by plate 108 and are held in place by insulating rings 174 and 175 and 176 at the edges of each. The rings have electric contact from the line cord 126 when they are touched by prongs 180 and 182 respectively. These prongs are passed through bores in a socket backing plate 184 and insulating sleeves 186 and 188 made of the same insulating material as the backing plate 184. The prongs have heads 190 and 192 against which springs 194 and 196 react in insulating body 198. This body is connected by a bolt 199 to the disk 100. Passages in heads 190 and 192 receive prongs 204 and 206 of plug 208. An electric wire 210 extends from the plug 208 and has a plug 219 at its end that connects in socket 220. This socket has a body similar to the body 198 and functions in a manner identical to the socket of Figure 6. Its prongs connect with slip ring assembly 158 that is arranged in the disk 72 just as the slip ring assembly 156 is arranged in the disk 100. Electric wire 228 has plug 230 at one end and is attached to the slip ring assembly 158. Wire 228 is connected to motor 22 at its opposite end.

In practical use the drill press is mounted on a surface that is capable of being magnetized. The electromagnet is energized when the drill press is placed in the correct position and then the press is set up. The various angles necessary to do a good and correct job are capable of being easily obtained. Then upon rotation of the handles 62 the motor is raised and lowered for drill operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a portable adjustable drill press which has a base, means to hold said base in a selected position, an upright, means adjustably connecting said upright onto said base, said connecting means including a pair of upstanding sides on said base, an aperture in each of said sides, said apertures being aligned, an aperture in said upright aligned with said side apertures, and means extending through said aligned apertures for selectively allowing rotation of said upright relative to said base and for locking said upright relative to said base, a motor, a motor support, means carried by said motor support and operatively connected with said motor for translating said motor to perform drilling operations on a work piece, means connected with said upright and said support for adjusting said support with respect to said upright, an electric wire operatively connected to said motor, an electric wire adapted to connect to a source of electrical energy and attach to said base, an electrically conductive means extending from said base to said upright and from said upright to said wire that is attached to said motor in order to energize said motor, said means attaching said upright and support together for adjustment including a wear plate and a disk connected respectively to said support and said upright, a ring connected to said wear plate and operatively engaged with said disk to constrain the motion of said support with respect to said disk and said upright, and a holddown bolt engageable with said disk and said wear plate to hold said support in selected adjusted positions.

2. In a drill press, a base which has a lower section and an upper section, means connecting said sections together for adjustment about an axis of rotation, said means including a disk and a wear plate, means connecting said disk and said wear plate for relative rotation about said axis, slip rings and contacts engaging said slip rings, said slip rings and contacts carried by said disk and said plate to establish electrical continuity between said base sections, a plug, a wire connected with said plug, a socket, said contacts constituting a part of said socket and adapted to be engaged by said plug, an upright pivotally connected to the upper section of said base, said pivotal connection including aligned apertures in said base and said upright, said base apertures being in the form of opposed cone sections, a bolt extending through said aligned apertures, a pair of opposed conical members seated in said conical apertures, one of said members having a threaded aperture therethrough for threadedly accommodating said bolt, a second of said members having an aperture therethrough for slidably accommodating said bolt adjacent said bolt head, said conical apertures and members being correspondingly grooved, electrical conductive means including a socket associated with said wire, for said upright, a motor support, a motor carried by said support and capable of a position of adjustment, said electrical conductive means establishing electrical continuity between said upright and said motor.

3. In a drill press, a base which has a lower section and an upper section, means connecting said sections together for adjustment about an axis of rotation, said means including a disk and a wear plate, means connecting said disk and said wear plate for relative rotation about said axis, slip rings and contacts engaging said slip rings, said slip rings and contacts carried by said disk and said plate to establish electrical continuity between said base sections, a plug, a wire connected with said plug, a socket, said contacts constituting a part of said socket and adapted to be engaged by said plug, an upright pivotally connected to the upper section of said base, said pivotal connection including aligned apertures in said base and said upright, said base apertures being in the form of opposed cone sections, a bolt extending through said aligned apertures, a pair of opposed conical members seated in said conical apertures, one of said members having a threaded aperture therethrough for threadedly accommodating said bolt, a second of said members having an aperture therethrough for slidably accommodating said bolt adjacent said bolt head, said conical apertures and members being correspondingly grooved, electrical conductive means including a socket associated with said wire, for said upright, a motor support, a motor carried by said support and capable of a position of adjustment, said electrical conductive means establishing electrical continuity between said upright and said motor, an electric wire which extends from said electrically conductive means and said motor, said motor having tracks and a rack between said tracks, said support having rails, said tracks enclosing guideways within which said rails are accommodated, and means including a pinion carried by said support that is engaged with said rack for adjusting the position of said motor in order to feed the motor toward a work piece.

References Cited in the file of this patent
UNITED STATES PATENTS

| | | |
|---|---|---|
| 1,534,271 | Koken | Apr. 21, 1925 |
| 1,741,044 | Whipple et al. | Dec. 24, 1929 |
| 1,941,348 | Hathorn | Dec. 26, 1933 |
| 2,050,709 | Lopez | Aug. 11, 1936 |
| 2,283,722 | Chandler | May 19, 1942 |
| 2,542,427 | Peck | Feb. 20, 1951 |
| 2,609,162 | Howsam | Sept. 2, 1952 |
| 2,619,879 | Hosea | Dec. 2, 1952 |
| 2,672,770 | Buck | Mar. 23, 1954 |
| 2,745,688 | Farrington et al. | May 15, 1956 |